Figure 1:
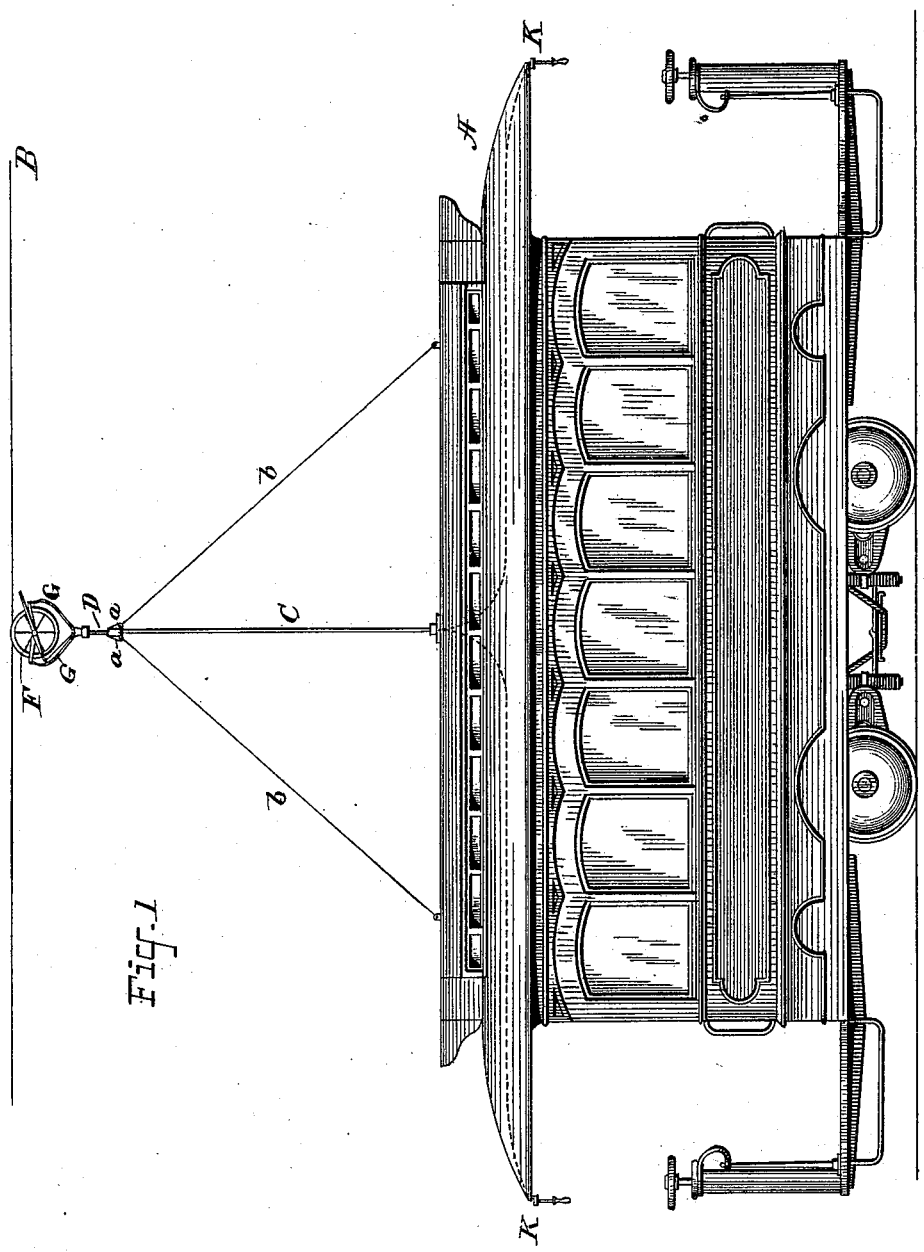

(No Model.) 4 Sheets—Sheet 1.
P. F. O'SHAUGHNESSY & O. T. CROSBY.
TROLLEY FOR ELECTRIC RAILWAYS.

No. 557,015. Patented Mar. 24, 1896.

(No Model.) 4 Sheets—Sheet 2.
P. F. O'SHAUGHNESSY & O. T. CROSBY.
TROLLEY FOR ELECTRIC RAILWAYS.
No. 557,015. Patented Mar. 24, 1896.
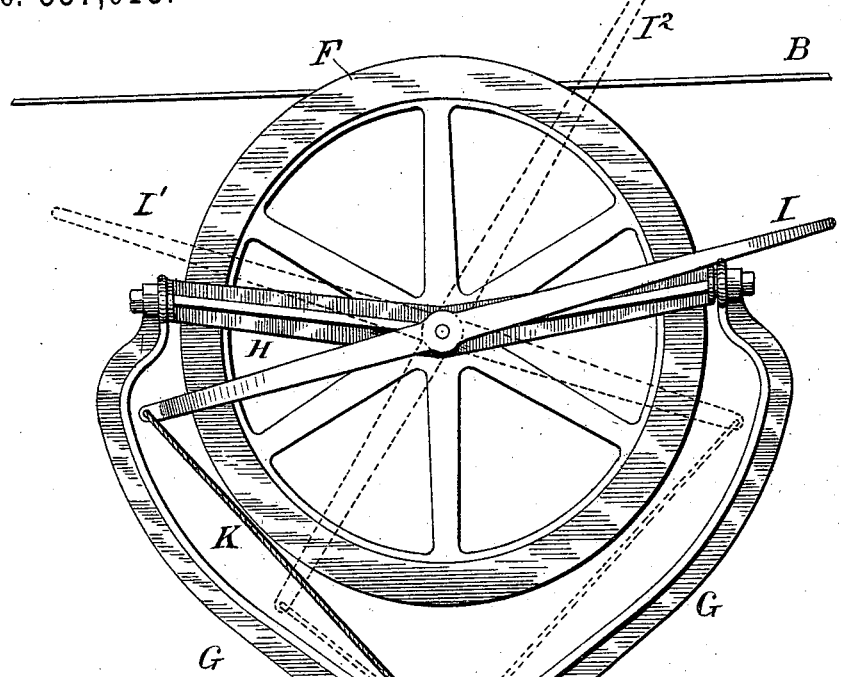
Fig. 2.
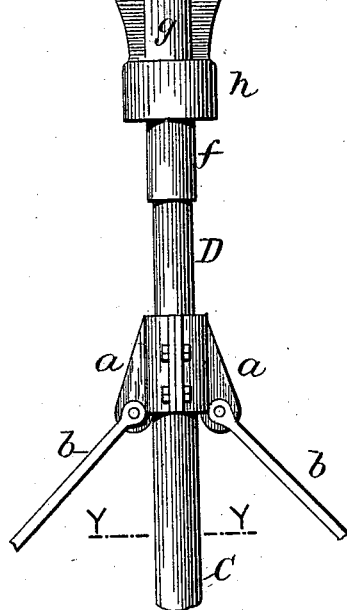
Witnesses
Inventors
By their Attorneys (No Model.) 4 Sheets—Sheet 3.
P. F. O'SHAUGHNESSY & O. T. CROSBY.
TROLLEY FOR ELECTRIC RAILWAYS.
No. 557,015. Patented Mar. 24, 1896.
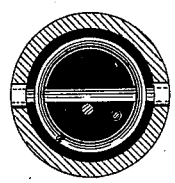
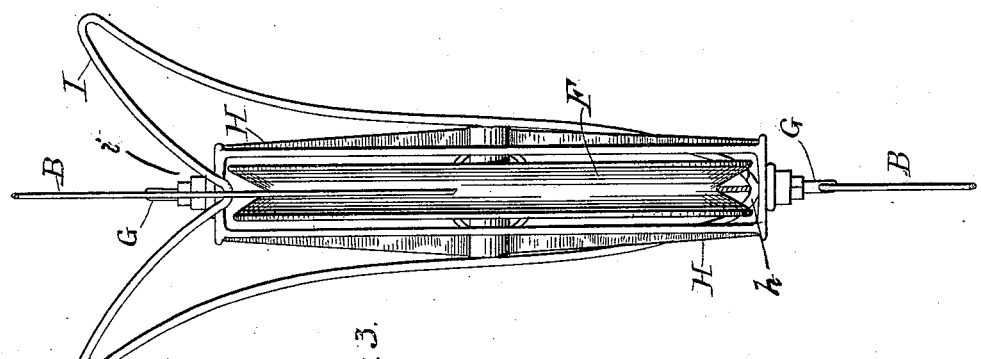
WITNESSES:
INVENTORS
BY
ATTORNEYS.

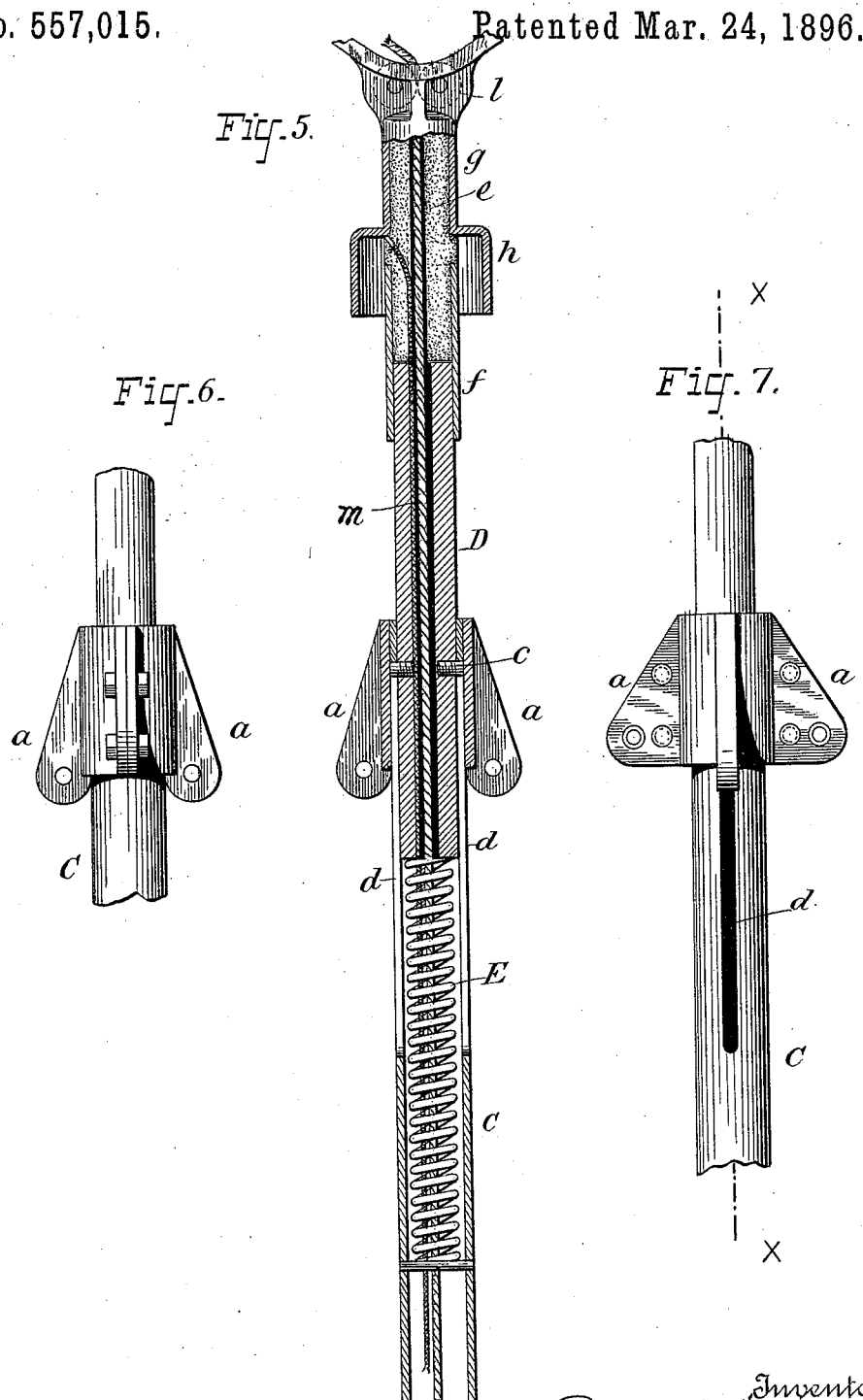

UNITED STATES PATENT OFFICE.

PATRICK F. O'SHAUGHNESSY AND OSCAR T. CROSBY, OF NEW YORK, N. Y., ASSIGNORS TO THE SPRAGUE ELECTRIC RAILWAY AND MOTOR COMPANY, OF SAME PLACE.

TROLLEY FOR ELECTRIC RAILWAYS.

SPECIFICATION forming part of Letters Patent No. 557,015, dated March 24, 1896.

Application filed September 27, 1888. Serial No. 286,544. (No model.)

*To all whom it may concern:*

Be it known that we, PATRICK F. O'SHAUGHNESSY and OSCAR T. CROSBY, citizens of the United States, residing at New York, in the county and State of New York, have invented a certain new and useful Improvement in Trolleys for Electric Railways, of which the following is a specification.

Our invention relates to that class of electric railways in which the current is conveyed to the motor by a line carried overhead, on the under side of which a contact-wheel carried on the top of the car travels, making an underneath contact with the conductor, so as to constantly take off current for the motor.

More especially our invention relates to features of construction of the overhead contact or trolley and the parts which support it, our object being to make the trolley readily adjustable, both vertically and laterally, so as to adapt it for irregularities in the line; to provide a suitable guide or line-finder to enable the trolley to be readily replaced on the line when it is accidently displaced; to enable such guide to be used in either direction of motion of the car; to enable the position of the guide and of the trolley to be controlled by the operator; to convey the current from the trolley to the motor in a simple and effective manner, and generally to increase the simplicity, convenience, and efficiency of devices of the character mentioned.

Our invention consists in the various novel devices and combinations of devices employed by us in accomplishing the above-named objects, as hereinafter set forth and claimed.

Our invention is illustrated in the accompanying drawings.

Figure 1 is a view of a railroad-car provided with a trolley embodying our invention; Fig. 2, a side view of the trolley on a larger scale; Fig. 3, a top view of the trolley, showing the overhead line; Fig. 4, a cross-section of the supporting-standard on the line Y Y of Fig. 2; Fig. 5, a central vertical section of the supporting-standard; Fig. 6, a side view of a portion thereof, and Fig. 7 a front view of the same portion.

A represents an electric-railway car, which, it will be understood, is provided with an electric motor for propelling it.

B is a wire carried overhead to convey current to the motors of the railway, the other side of the circuit being preferably formed by the rails on which the cars run.

Upon the top of the car is mounted a hollow vertical standard C, suitably secured to the roof of the car, so as to stand upright thereon. At the upper end of this hollow stem it is provided with lugs $a$, to which are secured stays $b$, which pass to the roof of the car. The upper end of the standard C is entered by a rod D, which is constantly pressed upwardly by the tension of a spiral spring E within the stem C and is guided by pins $c$ traveling in slots $d$ in the stem C.

The parts so far described are preferably made of suitable metal.

The trolley F is connected with the stem C by an insulating-joint consisting of a body of insulating material $e$ coupled to rod D by a sleeve $f$. Upon the insulating-body $e$ is placed the trolley-support, which consists of a thimble $g$, having a cup-shaped flange $h$ for protecting the parts beneath it from water, and branching arms G G, preferably formed in one piece with the thimble, which form the supports for the bearings of the trolley. The arms G G extend above the center of the trolley, and pivoted side pieces H extend from them to near the center of the trolley, and in these side pieces the axle of the trolley has its bearings. The trolley-frame is thus pivoted on a longitudinal axis, so that it is adapted to rock sidewise when necessary, and being pivoted above its center the tendency is for the trolley to return to its vertical position.

Pivoted upon the same axle as the trolley is the guide I. This is formed of heavy wire and is of the shape indicated in Fig. 3, its two sides converging at the lower end $h'$ and flaring outwardly to the upper end, and the upper end having a V-shaped recess $i$. The normal position of this guide is that indicated in full lines in Fig. 2, or the reverse position I'. The weight of the guide is so distributed as to cause it to normally assume one of these positions. To the lower end of the guide is attached a cord K, which extends down between guiding-rollers $l$ $l$ and through an opening in the insulating-joint $e$ and through the rod D and hollow stem C to within reach of the operator who has charge of the car. By means of the cord K the guide may be thrown over into the reverse position shown by the dotted lines I' in Fig. 2, or raised to the position shown by the dotted lines I², or to a corresponding position on the opposite side of the center.

It will be seen that the trolley is held constantly against the overhead wire by the tension of the spring E, and if at any time the trolley should leave the wire the pressure of the spring would throw the trolley up above the wire. Then the operator, in order to return the trolley to the wire, draws down on the cord K so as to pull the rod D down into the hollow stem against the spring E and at the same time raise the guide I, whereby the trolley is brought below the wire again, and then allows it to rise against the wire, the V-shaped recess in the guide assisting to guide the trolley to the wire. The operator then lets the cord go, and the guide falls to its normal position.

The current, which is taken from the wire by the trolley, is conveyed by an insulated wire $m$ to the motor, this wire being connected with the thimble $g$ and passing down through the supporting parts to the car.

What we claim is—

1. The combination with an electric-railway car, of a trolley for making an underneath contact with a conductor, a telescopic support for said trolley on the roof of the car, and means extending within reach of the operator for adjusting said trolley substantially as set forth.

2. The combination with an electric-railway car, of a hollow standard rising from its roof, a rod sliding in said standard, a trolley for making an underneath contact with a conductor, carried by said rod, and a spring in said hollow support forcing said rod upwardly, substantially as set forth.

3. The combination with an electric-railway car, of a hollow standard rising from its roof, a rod sliding in the standard, a trolley for making underneath contact with a conductor carried by the rod, and means within the hollow support for forcing the rod upward, substantially as set forth.

4. The combination with an electric-railway car, of a hollow support rising from its roof and carrying a movable trolley and a cord attached to said trolley and passing through said hollow support to within reach of the operator, substantially as set forth.

5. The combination with an electric-railway car, of a metal support rising from its roof, a contact-trolley carried by the said support and an insulating-joint interposed between said trolley and said support, substantially as set forth.

6. The combination with an electric-railway car, of a trolley for making contact with a conductor extending along the line of a railway, and a guide movable with the car for guiding said trolley to the conductor, substantially as set forth.

7. The combination with an electric-railway car, of a trolley for making contact with a conductor extending along the line of a railway, a guide for guiding said trolley to the conductor, and means extending within reach of the operator for operating said guide, substantially as set forth.

8. The combination with an electric-railway car, and the trolley for making underneath contact with a conductor, of the reversible guide for said trolley, substantially as set forth.

9. The combination with an electric-railway car and a trolley carried thereby for making underneath contact with a conductor, of the movable guide for said trolley and means extending within reach of the operator for moving said guide, substantially as set forth.

10. The combination with an electric-railway car, and the trolley for making underneath contact with a conductor, of the guide having flaring sides on each side of the trolley, and a V-shaped recess at its upper end, substantially as set forth.

11. The combination with an electric-railway car, and the trolley for making underneath contact with a conductor, of the pivoted flaring guide for said trolley and the line extending from said guide for moving the same, substantially as set forth.

12. The combination with an electric-railway car, of the trolley for making underneath contact with a conductor, the same being pivoted on a longitudinal axis, substantially as set forth.

13. The combination with an electric-railway car, of a trolley for making underneath contact with a conductor, the same being pivoted on a longitudinal axis and provided with means for maintaining it normally in a vertical position, substantially as set forth.

14. The combination with an electric-railway car, of the trolley for making underneath contact with a conductor, the same being pivoted above its center on a longitudinal axis, substantially as set forth.

15. The combination with an electric-railway car and a trolley carried thereby for making underneath contact with a conductor, of a guide normally beneath the conductor but movable into engagement therewith, so as to bring the trolley in contact with the conductor.

This specification signed and witnessed this 22d day of September, 1888.

PATRICK F. O'SHAUGHNESSY.
OSCAR T. CROSBY.

Witnesses:
J. A. HURDLE,
A. W. KIDDLE.